May 14, 1929.
C. I. HALL
1,713,179
ELECTRIC MEASURING INSTRUMENT
Original Filed Jan. 16, 1925
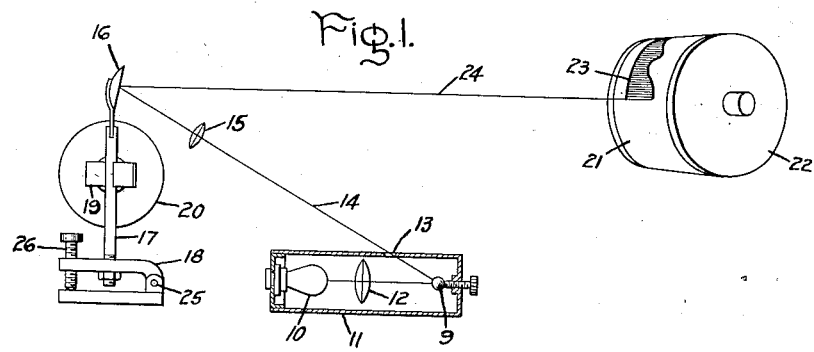
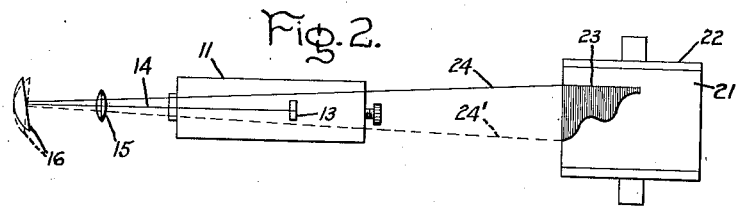
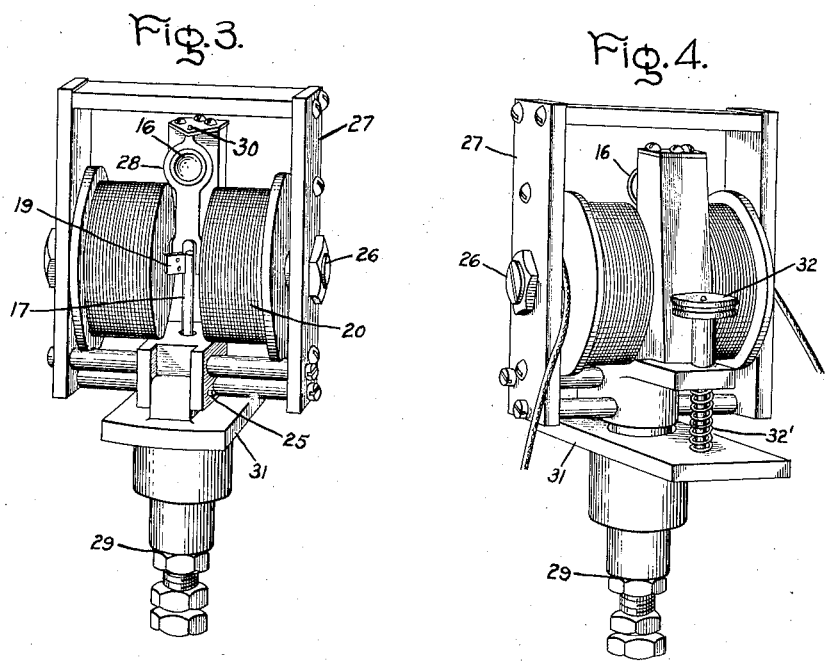
Inventor:
Chester I. Hall,
by *Alexander S. Smith*
His Attorney.

Patented May 14, 1929.

1,713,179

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

ELECTRIC MEASURING INSTRUMENT.

Original application filed January 16, 1925, Serial No. 2,908. Divided and this application filed March 2, 1926. Serial No. 91,841. Renewed November 3, 1928.

My invention relates to electric measuring instruments and in particular to a galvanometer structure suitable for recording phenomena which occur at a rapid rate.

This application is a division of my copending application, Serial No. 2,908, filed January 16, 1925, entitled "High speed graphic recorders".

Due to the tendency of electric power companies to build larger and larger power stations for the purpose of more economical distribution, the capacities of the main distribution lines have been greatly increased. Also, due to the extensive interconnection of long distribution networks, a line disturbance in one part of the system may be communicated to the whole system, and cause destructive line surges and transients at points very far distant from the place where the original fault occurred. Because of this concentration of power and interconnection of great power systems, the problem of faults has become acute, and the engineers of large power companies have been forced to enter upon a systematic study of these vital power problems. The recording instrument of the present invention was developed to fit the requirements of investigators in the study of such conditions as the rapid current and voltage variation caused by overloads and short circuits over an appreciable period, for example, over a time interval of sufficient duration to record what happens between the occurrence of a fault and the operation of overload relay devices. Where the investigator is interested in recording wave shapes, he may use an ordinary oscillograph; where he is interested in recording the usual variations in current and voltage, he may use an ordinary graphic recorder. The recorder of my invention is designed to fill the gap between these known types of recorders where it is desired to obtain a comprehensive record of such changes as current and voltage over an appreciable interval with sufficient rapidity as to show the maximum values for each half cycle.

In carrying my invention into effect, I employ an oscillograph type instrument, the most important points of novelty of which exist in the form of measuring galvanometer employed and the character of the light ray reflecting system. The type of galvanometer used may perhaps more appropriately be termed a heavy counter torque electric instrument in which the moment of inertia has been reduced and the torque increased to a point where it will follow changes in the quantity measured which occur during 1/2 cycle of a 60 cycle circuit, for example. The light ray reflecting system utilizes a secondary point source of light of intense brilliancy provided by focusing light rays upon a small spherical mirror. The invention also includes certain novel automatic recording features to be explained hereinafter.

The features of my invention which are believed to be novel and patentable will be pointed out in the claims appended hereto. For a better understanding of my invention, reference is made in the following description to the accompanying drawing in which Figs. 1 and 2 represent different views of the light ray reflecting system of my invention and Figs. 3 and 4 show front and rear perspective views of a meter element built in accordance with my invention.

In Fig. 1, I have represented a primary light source comprising an incandescent electric lamp 10 arranged in a container 11 which is provided with a lens 12 for collecting the light rays and concentrating them upon a highly polished sphere 9 used as a reflector. A slot 13 in the top of the tube allows a band of light rays 14 to be reflected from the spherical mirror to the exterior. The light rays 14 are intercepted by a focusing lens 15, the purpose of which is to direct a single beam of light upon a galvanometer mirror 16. The mirror 16 may be an ordinary concave galvanometer mirror and is mounted upon the upper end of a shaft 17. The shaft 17 is preferably made of brass or some other resilient nonmagnetic material and has its lower end rigidly secured in a support 18 which positively holds the lower end from twisting. At some distance from the support 18, the shaft 17 is provided with a vane 19 of magnetic material and adjacent the vane is a stationary magnet system 20. One suitable arrangement of this galvanometer or heavily damped meter is shown in Figs. 3 and 4 and will be described more in detail. Now, when no current is flowing through the coils of the stationary magnet system, the shaft 17 and mirror 16 will have a given axial position which will be termed the zero recording position and the system will be adjusted so that a light beam is reflected from the mirror 16 onto a photo-sensitive film 21 wrapped upon a rotatable drum 22. The zero recording position of this beam of light will fall upon the zero recording line 23 of the film. The vertical position of the beam 24 reflected from the spherical mirror may be adjusted by adjusting the support 18 about a horizontal axis 25 by means of the adjusting screw 26. When a current flows in the coil or coils of the stationary magnet system 20, the magnetic vane 19 will be attracted, causing the upper end of shaft 17 to twist a very small amount and thereby move the mirror 16 a corresponding small amount.

This movement is illustrated in Fig. 2 which represents a view looking down upon the apparatus shown in Fig. 1, where full lines may be taken to represent the zero recording position of the mirror 16 and the dotted lines a deflected position of the mirror. The movement of the mirror causes the reflected beam of light 24 to change its direction to that represented in dotted lines 24'. It will be evident that such a moving system has a very low moment of inertia but very high torque and counter-torque; also that the movement is very slight, so slight as not to be noticeable to an observer looking at the vane 19. Such a system is capable of giving a deflection of the light beam 24 proportional to the magnitude of the twisting torque produced by the magnet system with sufficient rapidity to enable the movable member to return to a zero recording position at the end of each half cycle of a 60 cycle current. The deflection for each half cycle is in the same direction and is proportional to the torque produced, which, in the case assumed, is proportional to the current flowing in the coils of the stationary magnet. Now, if the drum 22 be rotated and the apparatus is suitably enclosed to protect the film from other light, we may obtain a record such as is represented in Fig. 1 which shows up the actual value and the variations in current for each half cycle.

A preferred arrangement for a volt-meter element is represented in Figs. 3 and 4. This element consists of two coils 20 connected in series with adjustable poles 26 and a flux return path comprising a frame 27 of cold rolled annealed steel. The moving system includes an annealed steel vane 19 mounted in the air gap between the two magnets upon the upper end of a brass rod 17 which, in the construction shown, is .09" in diameter and 3" long. A small concave galvanometer reflecting mirror 16 having a diameter of 1/2" is carried by a stiff aluminum holder 28 rigidly secured to the vane 19. The small brass rod or shaft 17 is clamped at the bottom at 29 in such a position that the vane 19 makes an angle of about 45 degrees with the axis of the magnet poles. The vane has an air gap of approximately 1/12" on each side when in the zero deflecting position and has a deflection of approximately 1° 35' for 1" deflection of the recording beam on the film and 110 volts on the coils. The restraining torque of the brass rod is sufficient to give the moving system a natural frequency of about 600 vibrations per second. The stiff mirror support is preferably pivoted at the top at 30 to prevent shaft whipping with resultant loops on the film record. The moving element is preferably pivoted about a horizontal axis 25 to the base plate 31 so that its vertical position may be adjusted by means of the thumb screw 32 acting against a spring 32'. In describing this structure, I have given specific data for the purpose of illustrating one practical arrangement. However, I do not wish to be limited to these details of construction or to a volt-meter element. Where the current, frequency, power factor or other quantity is to be recorded, the meter coils and construction will be altered accordingly to give a deflection proportional to such quantities.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:—

1. An electric measuring instrument comprising a movable armature member and a stationary field member, a rod of resilient material, said armature being secured to said rod in such position with respect to the field member as to exert a twisting force upon said rod when the field is energized, said rod being rigidly secured against twisting at one end and having its opposite end free to turn.

2. An electric measuring instrument comprising a stationary field member arranged to be energized in proportion to some desired measurement, a vane armature of magnetic material positioned to be influenced by said field when energized, a short resilient rod for supporting said vane, said rod being rigidly secured at one end against twisting and constituting a torsional return spring for said vane.

3. An electric measuring instrument comprising a stationary field member and a movable armature member, said armature member being rigidly secured to a rod which is rigidly secured at one end in adjustable fixed relation to the field member so as to constitute a torsional return spring and support for said armature, said rod being proportioned to have a natural period of vibration of about 600 vibrations per second.

4. A deflection galvanometer comprising a stationary field member and a rotatable armature member positioned so as to be influenced by said field member when energized, a rod to which said armature is rigidly secured, said rod lying in the axis of rotation of said armature and having one end secured in fixed relation to said field member and its other end rotatably supported, and a mirror carried by the rotatably supported end of said rod.

5. An electric measuring instrument for investigating abnormal conditions of an electric circuit comprising a stationary field member adapted to be energized from the circuit under investigation, a movable armature member associated with said field member, said armature being rigidly secured to a rod which is rigidly secured at one end only in fixed relation to the field member so as to constitute a torsional return spring and support for said armature, said rod being proportioned to return the armature to a zero position after a deflection within 1/120th of a second.

In witness whereof, I have hereunto set my hand this 26th day of Feb., 1926.

CHESTER I. HALL.